(12) United States Patent
Roegner

(10) Patent No.: US 8,745,046 B2
(45) Date of Patent: *Jun. 3, 2014

(54) METHOD AND SYSTEM FOR SELECTING CONTENT ITEMS TO BE PRESENTED TO A VIEWER

(71) Applicant: Jericho Systems Corporation, Dallas, TX (US)

(72) Inventor: Michael W. Roegner, Plano, TX (US)

(73) Assignee: Jericho Systems Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,524

(22) Filed: Apr. 8, 2013

(65) Prior Publication Data

US 2014/0019263 A1    Jan. 16, 2014

Related U.S. Application Data

(63) Continuation of application No. 13/245,737, filed on Sep. 26, 2011, now Pat. No. 8,438,159, which is a continuation of application No. 12/855,308, filed on Aug. 12, 2010, now Pat. No. 8,060,504, which is a continuation of application No. 10/852,406, filed on May 24, 2004, now Pat. No. 7,792,828.

(60) Provisional application No. 60/482,487, filed on Jun. 25, 2003.

(51) Int. Cl.
| G06F 17/30 | (2006.01) |
| G06F 7/00 | (2006.01) |
| G06F 3/00 | (2006.01) |
| G06Q 30/00 | (2012.01) |

(52) U.S. Cl.
USPC ........... 707/728; 707/723; 707/748; 725/46; 705/14.53; 705/14.66; 705/14.71

(58) Field of Classification Search
USPC .......... 707/728, 723, 748; 725/46; 705/14.49, 705/14.53, 14.55, 14.58, 14.66, 14.69, 705/14.71
See application file for complete search history.

(56) References Cited

U.S. PATENT DOCUMENTS

| 4,698,230 A | 10/1987 | Willard |
| 5,623,601 A | 4/1997 | Vu |
| 5,629,980 A | 5/1997 | Stefik et al. |
| 5,634,012 A | 5/1997 | Stefik et al. |
| 5,638,443 A | 6/1997 | Stefik et al. |
| 5,715,403 A | 2/1998 | Stefik |
| 5,752,238 A | 5/1998 | Dedrick |
| 5,754,938 A | 5/1998 | Herz et al. |

(Continued)

FOREIGN PATENT DOCUMENTS

JP    2001184264 A    7/2001

OTHER PUBLICATIONS

In the U.S. Patent and Trademark Office U.S. Appl. No. 10/755,173, Final Office Action dated Apr. 18, 2008, 7 pages.

(Continued)

*Primary Examiner* — Hoang-Vu A Nguyen-Ba
(74) *Attorney, Agent, or Firm* — David R. Staggs

(57) ABSTRACT

Systems and methods are provided for determining eligible content items. In one example, the determination is based, at least in part, on information about at least one previously presented content item.

20 Claims, 7 Drawing Sheets

(56) References Cited

U.S. PATENT DOCUMENTS

| | | | |
|---|---|---|---|
| 5,754,939 A | 5/1998 | Herz et al. | |
| 5,757,917 A | 5/1998 | Rose et al. | |
| 5,761,601 A | 6/1998 | Nemirofsky et al. | |
| 5,768,521 A | 6/1998 | Dedrick | |
| 5,774,170 A | 6/1998 | Hite et al. | |
| 5,781,894 A | 7/1998 | Petrecca et al. | |
| 5,790,426 A | 8/1998 | Robinson | |
| 5,794,210 A | 8/1998 | Goldhaber et al. | |
| 5,796,945 A | 8/1998 | Tarabella | |
| 5,796,952 A | 8/1998 | Davis et al. | |
| 5,809,242 A | 9/1998 | Shaw et al. | |
| 5,838,790 A | 11/1998 | McAuliffe et al. | |
| 5,848,396 A | 12/1998 | Gerace | |
| 5,848,397 A | 12/1998 | Marsh et al. | |
| 5,855,008 A | 12/1998 | Goldhaber et al. | |
| 5,870,724 A | 2/1999 | Lawlor et al. | |
| 5,872,850 A | 2/1999 | Klein et al. | |
| 5,893,075 A | 4/1999 | Plainfield et al. | |
| 5,913,040 A | 6/1999 | Rakavy et al. | |
| 5,918,014 A | 6/1999 | Robinson | |
| 5,933,498 A | 8/1999 | Schneck et al. | |
| 5,933,811 A | 8/1999 | Angles et al. | |
| 5,937,392 A | 8/1999 | Alberts | |
| 5,946,646 A | 8/1999 | Schena et al. | |
| 5,948,061 A | 9/1999 | Merriman et al. | |
| 5,960,409 A | 9/1999 | Wexler | |
| 5,990,927 A | 11/1999 | Hendricks et al. | |
| 5,999,912 A | 12/1999 | Wodarz et al. | |
| 6,002,393 A | 12/1999 | Hite et al. | |
| 6,006,197 A | 12/1999 | d'Eon et al. | |
| 6,006,252 A | 12/1999 | Wolfe | |
| 6,016,509 A | 1/2000 | Dedrick | |
| 6,026,368 A | 2/2000 | Brown et al. | |
| 6,029,141 A | 2/2000 | Bezos et al. | |
| 6,029,195 A | 2/2000 | Herz | |
| 6,035,404 A | 3/2000 | Zhao | |
| 6,044,376 A | 3/2000 | Kurtzman, II | |
| 6,049,777 A | 4/2000 | Sheena et al. | |
| 6,061,659 A | 5/2000 | Murray | |
| 6,070,244 A | 5/2000 | Orchier et al. | |
| 6,078,866 A | 6/2000 | Buck et al. | |
| 6,088,451 A * | 7/2000 | He et al. | 726/8 |
| 6,098,065 A | 8/2000 | Skillen et al. | |
| 6,119,101 A | 9/2000 | Peckover | |
| 6,144,944 A | 11/2000 | Kurtzman, II et al. | |
| 6,167,382 A | 12/2000 | Sparks et al. | |
| 6,182,050 B1 | 1/2001 | Ballard | |
| 6,185,586 B1 | 2/2001 | Judson | |
| 6,192,380 B1 | 2/2001 | Light et al. | |
| 6,223,215 B1 | 4/2001 | Hunt et al. | |
| 6,233,608 B1 | 5/2001 | Laursen et al. | |
| 6,236,971 B1 | 5/2001 | Stefik et al. | |
| 6,253,203 B1 | 6/2001 | O'Flaherty et al. | |
| 6,263,364 B1 * | 7/2001 | Najork et al. | 709/217 |
| 6,269,361 B1 | 7/2001 | Davis et al. | |
| 6,285,987 B1 | 9/2001 | Roth et al. | |
| 6,304,967 B1 | 10/2001 | Braddy | |
| 6,308,175 B1 * | 10/2001 | Lang et al. | 707/608 |
| 6,332,163 B1 * | 12/2001 | Bowman-Amuah | 709/231 |
| 6,385,592 B1 | 5/2002 | Angles et al. | |
| 6,401,075 B1 | 6/2002 | Mason et al. | |
| 6,418,433 B1 * | 7/2002 | Chakrabarti et al. | 1/1 |
| 6,453,419 B1 | 9/2002 | Flint et al. | |
| 6,466,970 B1 * | 10/2002 | Lee et al. | 709/217 |
| 6,498,795 B1 * | 12/2002 | Zhang et al. | 370/400 |
| 6,505,194 B1 * | 1/2003 | Nikolovska et al. | 707/768 |
| 6,584,492 B1 | 6/2003 | Cezar et al. | |
| 6,615,251 B1 | 9/2003 | Klug et al. | |
| 6,647,388 B2 | 11/2003 | Numao et al. | |
| 6,665,838 B1 | 12/2003 | Brown et al. | |
| 6,718,551 B1 | 4/2004 | Swix et al. | |
| 6,721,748 B1 * | 4/2004 | Knight et al. | 1/1 |
| 6,757,662 B1 | 6/2004 | Greenwald et al. | |
| 6,778,975 B1 | 8/2004 | Anick et al. | |
| 6,782,369 B1 | 8/2004 | Carrott | |
| 6,804,659 B1 | 10/2004 | Graham et al. | |
| 6,871,202 B2 | 3/2005 | Broder | |
| 6,892,181 B1 | 5/2005 | Megiddo et al. | |
| 6,892,354 B1 | 5/2005 | Servan-Schreiber et al. | |
| 6,907,566 B1 | 6/2005 | McElfresh et al. | |
| 6,978,263 B2 | 12/2005 | Soulanille | |
| 6,978,366 B1 | 12/2005 | Ignatchenko et al. | |
| 6,983,272 B2 | 1/2006 | Davis et al. | |
| 6,985,882 B1 | 1/2006 | Del Sesto | |
| 6,985,946 B1 | 1/2006 | Vasandani et al. | |
| 6,993,534 B2 * | 1/2006 | Denesuk et al. | 1/1 |
| 7,010,689 B1 | 3/2006 | Matyas, Jr. et al. | |
| 7,016,875 B1 | 3/2006 | Steele et al. | |
| 7,035,812 B2 | 4/2006 | Meisel et al. | |
| 7,039,599 B2 | 5/2006 | Merriman et al. | |
| 7,039,804 B2 | 5/2006 | Fichtner et al. | |
| 7,043,471 B2 | 5/2006 | Cheung et al. | |
| 7,043,483 B2 | 5/2006 | Colace et al. | |
| 7,100,111 B2 | 8/2006 | McElfresh et al. | |
| 7,110,993 B2 | 9/2006 | Soulanille et al. | |
| 7,136,853 B1 | 11/2006 | Kohda et al. | |
| 7,136,860 B2 | 11/2006 | Doliov | |
| 7,136,875 B2 | 11/2006 | Anderson et al. | |
| 7,139,732 B1 | 11/2006 | Desenberg | |
| 7,140,044 B2 | 11/2006 | Redlich et al. | |
| 7,146,560 B2 | 12/2006 | Dang et al. | |
| 7,162,471 B1 * | 1/2007 | Knight et al. | 707/750 |
| 7,185,010 B2 * | 2/2007 | Morinville | 1/1 |
| 7,197,497 B2 | 3/2007 | Cossock | |
| 7,207,067 B2 | 4/2007 | Feng et al. | |
| 7,231,358 B2 | 6/2007 | Singh et al. | |
| 7,251,666 B2 * | 7/2007 | Morinville | 707/792 |
| 7,260,555 B2 | 8/2007 | Rossmann et al. | |
| 7,266,551 B2 | 9/2007 | Kravets | |
| 7,346,606 B2 | 3/2008 | Bharat | |
| 7,349,876 B1 | 3/2008 | Veach | |
| 7,398,266 B2 | 7/2008 | Black et al. | |
| 7,406,460 B2 | 7/2008 | Burrows | |
| 7,434,048 B1 | 10/2008 | Shapiro et al. | |
| 7,447,691 B2 | 11/2008 | Doliov | |
| 7,454,409 B2 | 11/2008 | Roy et al. | |
| 7,478,418 B2 | 1/2009 | Supramaniam et al. | |
| 7,496,943 B1 | 2/2009 | Goldberg et al. | |
| 7,499,874 B2 | 3/2009 | Singh et al. | |
| 7,512,976 B2 | 3/2009 | Burrows | |
| 7,565,683 B1 | 7/2009 | Huang et al. | |
| 7,647,299 B2 | 1/2010 | Harik | |
| 7,668,832 B2 | 2/2010 | Yeh et al. | |
| 7,685,156 B2 | 3/2010 | Morinville | |
| 7,693,827 B2 | 4/2010 | Zamir et al. | |
| 7,697,791 B1 | 4/2010 | Chan et al. | |
| 7,698,266 B1 | 4/2010 | Weissman et al. | |
| 7,707,053 B2 | 4/2010 | Veach | |
| 7,716,161 B2 | 5/2010 | Dean et al. | |
| 7,734,624 B2 | 6/2010 | Anderson et al. | |
| 7,778,872 B2 | 8/2010 | Kamangar et al. | |
| 7,779,247 B2 | 8/2010 | Roegner | |
| 7,783,765 B2 | 8/2010 | Hildebrand et al. | |
| 7,792,698 B1 | 9/2010 | Veach et al. | |
| 7,792,818 B2 | 9/2010 | Fain et al. | |
| 7,792,828 B2 | 9/2010 | Roegner | |
| 7,813,966 B2 | 10/2010 | Alaia et al. | |
| 7,818,207 B1 | 10/2010 | Veach | |
| 7,822,777 B2 | 10/2010 | Morinville | |
| 7,827,062 B2 | 11/2010 | Merriman et al. | |
| 7,831,693 B2 | 11/2010 | Lai | |
| 7,835,943 B2 | 11/2010 | Cheung et al. | |
| 7,844,488 B2 | 11/2010 | Merriman et al. | |
| 7,844,493 B1 | 11/2010 | Veach et al. | |
| 7,865,931 B1 | 1/2011 | Stone et al. | |
| 7,873,536 B2 | 1/2011 | Desikan et al. | |
| 2001/0037205 A1 | 11/2001 | Joao | |
| 2001/0056374 A1 | 12/2001 | Joao | |
| 2002/0002684 A1 | 1/2002 | Fox et al. | |
| 2002/0013785 A1 | 1/2002 | Miyazaki et al. | |
| 2002/0019831 A1 | 2/2002 | Wade | |
| 2002/0032740 A1 * | 3/2002 | Stern et al. | 709/206 |
| 2002/0046118 A1 | 4/2002 | Minte | |
| 2002/0052928 A1 * | 5/2002 | Stern et al. | 709/218 |

(56) References Cited

U.S. PATENT DOCUMENTS

| | | | |
|---|---|---|---|
| 2002/0066042 A1 | 5/2002 | Matsumoto et al. | |
| 2002/0082923 A1 | 6/2002 | Merriman et al. | |
| 2002/0099600 A1 | 7/2002 | Merriman et al. | |
| 2002/0103698 A1 | 8/2002 | Cantrell | |
| 2002/0112035 A1 | 8/2002 | Carey et al. | |
| 2002/0112155 A1* | 8/2002 | Martherus et al. | 713/155 |
| 2002/0120507 A1 | 8/2002 | Chanos et al. | |
| 2002/0156779 A1 | 10/2002 | Elliott et al. | |
| 2003/0023489 A1 | 1/2003 | McGuire et al. | |
| 2003/0120601 A1 | 6/2003 | Ouye et al. | |
| 2003/0130887 A1* | 7/2003 | Nathaniel | 705/14 |
| 2003/0154406 A1 | 8/2003 | Honarvar et al. | |
| 2003/0167298 A1 | 9/2003 | Bazinet et al. | |
| 2004/0268388 A1 | 12/2004 | Roegner | |
| 2005/0086244 A1 | 4/2005 | Morinville | |
| 2005/0097188 A1 | 5/2005 | Fish | |
| 2010/0312741 A1 | 12/2010 | Roegner | |

OTHER PUBLICATIONS

In the U.S. Patent and Trademark Office U.S. Appl. No. 10/755,173, Interview Summary dated Jul. 25, 2008, 4 pages.
In the U.S. Patent and Trademark Office U.S. Appl. No. 10/755,173, Non-Final Office Action dated Apr. 30, 2007, 12 pages.
In the U.S. Patent and Trademark Office U.S. Appl. No. 10/755,173, Non-Final Office Action dated Oct. 2, 2008. 9 pages.
In the U.S. Patent and Trademark Office U.S. Appl. No. 10/852,406, Notice of Allowance dated May 6, 2010, 6 pages.
In the U.S. Patent and Trademark Office U.S. Appl. No. 12/658,421, Non-Final Office Action dated Jan. 20, 2011, 14 pages.
In the U.S. Patent and Trademark Office U.S. Appl. No. 12/855,308 Non-Final Office Action dated Jan. 12, 2011, 11 pages.
In the U.S. Patent and Trademark Office U.S. Appl. No. 10/755,173, Notice of Allowance dated Dec. 17, 2009, 6 pages.
In the U.S. Patent and Trademark Office U.S. Appl. No. 10/755,173, Notice of Allowance dated Jun. 26, 2009, 7 pages.
In the U.S. Patent and Trademark Office U.S. Appl. No. 10/755,173, Notice of Allowance dated Mar. 6, 2009, 4 pages.
In the U.S. Patent and Trademark Office U.S. Appl. No. 10/852,406, Final Office Action dated Aug. 13, 2008, 13 pages.
In the U.S. Patent and Trademark Office U.S. Appl. No. 10/852,406, Non-Final Office Action dated Dec. 23, 2011, 9 pages.
In the U.S. Patent and Trademark Office U.S. Appl. No. 10/852,406, Non-Final Office Action dated Nov. 21, 2011, 16 pages.
In the U.S. Patent and Trademark Office U.S. Appl. No. 10/852,406, Office Action dated Mar. 24, 2009, 13 pages.
In the U.S. Patent and Trademark Office U.S. Appl. No. 13/245,737, Notice of Allowance dated Mar. 11, 2013, 6 pages.
In the U.S. Patent and Trademark Office U.S. Appl. No. 13/245,737, Office Action dated Jul. 26, 2012, 12 pages.
"eXtensible Access Control Markup Language (XACML) Version 1.0," OASIS Standard, Feb. 18, 2003; 132 pages.
"OASIS eXtensible Access Control Markup Language (XACML)," Committee Specification 1.0, Nov. 7, 2002, 129 pages.
Adams et al., Oasis XACML Technical Committee Meeting, [online], Apr. 22, 2002, Retrieved from the Internet: <URL: http://lists.oasis-open.org/archives/xacml/200205/doc00000.doc>, pp. 1-12.
Adams, "XACML 1.0 Approved as a Committee Specification," Nov. 8, 2002, 2 pages.
Adams, [xacml] Major milestone achived, and next step . . . , [online], Mar. 28, 2002. Message posted to xacml@lists.oasis-open.org, archived at and retrieved from the Internet: <URL: http://lists.oasis-open.org/archives/xacm1/200203/msg00112.html>, pp. 1-2.
Anderson, [xacml] Commit to implement XACML?, [online], Jun. 25, 2002. Message posted to xacml@lists.oasis-open.org, archived at and retrieved from the Internet: <URL: http://lists.oasis-open.org/archives/xacm1/200206/msg00090.html>, pp. 1-2.
Anderson, [xacml] Examples of J2SE Policy via XACML, [online], Apr. 19, 2002. Message posted to xacml@lists.oasis-open.org, archived at and retrieved from the Internet: <URL: http://lists.oasis-open.org/archives/xacml/200204/msg00130.html>, pp. 1-7.
Anderson, [xacml] RE: Conformance Tests, [online], Sep. 5, 2002. Forwarded message from John Howard. Message posted to xacml@lists.oasis-open.org, archived at and retrieved from the Internet: <URL: http://lists.oasisopen.org/archives/xacml/200209/msg00027.html>, pp. 1-3.
Anderson, FW: ContentGuard IPR Declaration for OASIS re: XACML, [online], Nov. 26, 2002. Message posted to xacml@lists.oasis-open.org, archived at and retrieved from the Internet: <URL: http://lists.oasis-open.org/archives/xacml/200211/msg00189.html>, pp. 1-2.
Barroso et al., "Web sarch for a planet: The Google Cluster Architecture," [online], IEEE Micro, Mar.-Apr. 2003; 23(2):22-28, Retrieved from the Internet: <URL: http://static.googleusercontent.com/external content/untrusteddlcp/labs.google.com/en/us/papers/googlecluster-ieee.pdf>.
Best, [xacml] Re: XACML 1.0 approved as a Committee Specification!, [online], Nov. 8, 2002. Message posted to xacml@lists.oasis-open.org, archived at and retrieved from the Internet: <URL: http://lists.oasis-open.org/archives/xacml/200211/msg00118.html>, pp. 1-3.
Erickson, Re: [xacml] Fundamental concepts in XACML, [online], Jun. 17, 2002. Message posted to xacml@lists.oasis-open.org, archived at and retrieved from the Internet: <URL: http://lists.oasis-open.org/archives/xacml/200206/msg00052.html>, pp. 1-3.
Ghemawat et al., "The Google File System," in Proc. 19th ACM GSymp. On Operating Syst. Principles, Oct. 19-22, 2003, Retrieved from the Internet: <URL: http://static.googleusercontent.com/external content/untrusted dlcp/research.google.com/en/us/archive/gfs-sosp2003.pdf>, pp. 29-43.
Kudoh, [use case] revised document, [online], Sep. 4, 2001, Message posted to xacml@lists.oasis-open.org, archived at and retrieved from the Internet: <URL: http://lists.oasis-open.org/archives/xacml/200109/msg00003.html>, pp. 1-2.
Kudoh, [xacml] US Patent Application, [online], May 3, 2002. Message posted to xacml@lists.oasis-open.org, archived at and retrieved from the Internet: <URL: http://lists.oasis-open.org/archives/xacml/200205/msg00006.html>, pp. 1-2.
Kudoh, F2F 2 meeting slides Use Case and Requirement, [online], Sep. 10, 2011, Retrieved from the Internet: <URL: http://lists.oasis-open.org/archives/xacml/200109/bin00006.bin>, pp. 1-8.
Kudoh, Slides used in F2F#2, [online], Sep. 11, 2001, Message posted to xacml@lists.oasis-open.org, archived at and retrieved from the Internet: <URL: http://lists.oasis-open.org/archives/xacml/200109/msg00055.html>.
Lockhart, (Powerpoint Slides presented Dec. 11, 2002) eXtensible Access Control Markup Language (XACML), pp. 1-21.
Lockhart, [xacml] Champions Missing from F2F, [online], Mar. 7, 2002. Message posted to xacml@lists.oasis-open.org, archived at and retrieved from the Internet: <URL: http://lists.oasis-open.org/archives/xacmll/200203/msg00014.html>, p. 1.
Lockhart, [xacml] Slides Presented to PRISM, [online], Jan. 9, 2003. Message posted to xacml@lists.oasis-open.org, archived at and retrieved from the Internet: <URL: http://lists.oasis-open.org/archives/xacmll/200301/msg00005.html>, pp. 1.
Maclean, [xacml] RE: [xacml] XrML & XACML Review, [online], Apr. 1, 2002. Message posted to xacml@lists.oasis-open.org, archived at and retrieved from the Internet: <URL: http://lists.oasis-open.org/archives/xacml/200204/msg00000.html>, pp. 1-2.
Marquard, "ASP.NET Performance Monitoring, and When to Alert Administrators," *ASP.NET Technical Articles*, Microsoft Corp., Updated Jul. 2003, 17 pages.
Moses et al., draft-xacml-v0.10, [online], Mar. 8, 2002, Retrieved from the Internet: <URL: http://lists.oasis-open.org/archives/xacml/200203/doc00000.doc>, pp. 1-35.
Moses et al., draft-xacml-v0.11, [online], Mar. 19, 2002, Retrieved from the Internet: <URL: http://lists.oasis-open.org/archives/xacml/200203/doc00002.doc>, pp. 1-41.
Moses et al., draft-xacml-v0.12, [online], Apr. 2, 2002, Retrieved from the Internet: <URL: http://lists.oasis-open.org/archives/xacml/200204/doc00001.doc>, pp. 1-44.

(56) References Cited

OTHER PUBLICATIONS

Moses et al., draft-xacml-v0.14, [online], Jun. 14, 2002, Retrieved from the Internet: <URL: http://lists.oasis-open.org/archives/xacml/200206/doc00000.doc>, pp. 1-57.
Moses et al., draft-xacml-v0.15, [online], Jul. 12, 2002, Retrieved from the Internet: <URL: http://lists.oasis-open.org/archives/xacml/200207/doc00003.doc>, pp. 1-56.
Moses et al., draft-xacml-v0.16, [online], Aug. 22, 2002, Retrieved from the Internet: <URL: http://lists.oasis-open.org/archives/xacml/200208/doc00009.doc>, pp. 1-86.
Moses et al., draft-xacml-v0.9, [online], Feb. 14, 2002, Retrieved from the Internet: <URL: http://lists.oasis-open.org/archives/xacml/200202/doc00002.doc>, pp. 1-32.
Moses et al., draft-xacml-v12, [online], Sep. 27, 2002, Retrieved from the Internet: <URL: http://lists.oasis-open.org/archives/xacml/200209/doc00002.doc>, pp. 1-113.
Moses et al., OASIS eXtensible Access Control Markup Language (XACML) Committee Specification 1.0 (Revision 1), [online], Dec. 12, 2002. Retrieved from the Internet: <URL: http://lists.oasis-open.org/archives/xacml/200212/doc00001.doc>, pp. 1-129.
Moses et al., OASIS eXtensible Access Control Markup Language (XACML) Committee Specification 1.0, [online], Oct. 25, 2002. Retrieved from the Internet: <URL: http://lists.oasis-open.org/archives/xacml/200210/doc00004.doc>, pp. 1-121.
Moses et al., OASIS eXtensible Access Control Markup Language (XACML) Committee Specification 1.0, [online], Oct. 8, 2002. Retrieved from the Internet: <URL: http://lists.oasis-open.org/archives/xacml/200210/doc00000.doc>, pp. 1-117.
Moses et al., XACML language proposal V.0.4, [online], Nov. 5, 2001, Retrieved from the Internet: <URL: http://lists.oasis-open.org/archives/xacml/200111/doc00002.doc>, pp. 1-13.
Moses et al., XACML langugage proposal V.0.6, [online], Nov. 23, 2001, Retrieved from the Internet: <URL: http://lists.oasis-open.org/archives/xacml/200111/doc00005.doc>, pp. 1-23.
Moses et al., XACML langugage proposal V.0.7, [online], Nov. 27, 2001, Retrieved from the Internet: <URL: http://lists.oasis-open.org/archives/xacml/200111/doc00006.doc>, pp. 1-30.
Moses et al., XACML langugage proposal V.0.8, [online], Jan. 10, 2002, Retrieved from the Internet: <URL: http://lists.oasis-open.org/archives/xacml/200201/doc00000.doc>, pp. 1-35.
Moses, Clinical Record Use Cases, [online], Sep. 4, 2001, [retrieved on Sep. 9, 2001], Retrieved from the Internet: <URL: http://lists.oasis-open.org/archives/xacml/200109/pdf00001.pdf>, pp. 1-45.
Netz et al., "Integrating Data Mining with SQL Databases: OLE DB for Data Mining," *IEEE*, 2001.
OASIS, eXtensible Access Control Markup Language TC, Face to Face Meeting #1 of the XACML TC Agenda, [online], Updated Jul. 17, 2001, Retrieved from the Internet: <URL: http://www.oasis-open.org/committees/xacml/agendas/20010718-f2f1.shtml>, pp. 1-3.
OASIS, eXtensible Access Control Markup Language TC, Face to Face Meeting #2 Agenda, [online], to be delivered Sep. 10, 2001, Retrieved from the Internet: <URL: http://www.oasis-open.org/committees/xacml/agendas/20010910-f2f2.shtml#minutes>, pp. 1-3.
Pilz, Domain model, Draft-xtc-use-domain-02, [online], Jun. 12, 2001, Retrieved from the Internet: <URL: http://lists.oasis-open.org/archives/xacml/200107/doc00000.doc>, pp. 1-5.
Pilz, XACML Draft-xtc-use-domain-01, [online], Jun. 7, 2001, Retrieved from the Internet: <URL: http://lists.oasis-open.org/archives/xacml/200106/doc00000.doc>, pp. 1-3.
Thorpe, "Business Rule Exchange—the Next XML Wave," May 21-25, 2001, XML Europe 2001 Internationales Congress Centrum (ICC) Berlin, Germany.
Yagen, [xacml] XACML Feb. 21, 2002 Minutes, [online], Sep. 4, 2001, Message posted to xacml@lists.oasis-open.org, archived at and retrieved from the Internet: <URL: http://lists.oasis-open.org/archives/xacml/200202/msg00124.html>, pp. 1-5.
Yagen, FTF#1 Jul. 18, 2001 Minutes, [online], Jul. 23, 2001, Message posted to xacml@lists.oasis-open.org, archived at and retrieved from the Internet: <URL: http://lists.oasis-open.org/archives/xacml/200107/msg00033.html>, pp. 1-11.

* cited by examiner

METHOD AND SYSTEM FOR SELECTING CONTENT ITEMS TO BE PRESENTED TO A VIEWER

RELATED APPLICATIONS

This application is a continuation of U.S. patent application Ser. No. 13/245,737, filed Sep. 26, 2011, which is a continuation of U.S. patent application Ser. No. 12/855,308 filed Aug. 12, 2010, which is a continuation of U.S. patent application Ser. No. 10/852,406 filed on May 24, 2004, which is incorporated herein by reference in its entirety and claims the benefit of priority to U.S. Provisional Patent Application No. 60/482,487 filed on Jun. 25, 2003, which is incorporated herein by reference in its entirety. This application is related to and incorporates by reference U.S. Provisional Patent Application No. 60/438,972 filed Jan. 9, 2003 entitled, "Method and System for Dynamically Implementing an Enterprise Resource Policy", and U.S. patent application Ser. No. 10/755,173 filed Jan. 9, 2004 entitled, "System and Method for Dynamically Implementing an Enterprise Resource Policy."

TECHNICAL FIELD OF THE INVENTION

The invention relates to a system operable to select optimal content to be presented to a viewer, based upon both the characteristics of the viewer and the viewing situation.

The present invention relates generally to marketing systems and methods, and more particularly, a system and method for dynamically segmenting and targeting marketing.

BACKGROUND OF THE INVENTION

Over the last decade, technology has drastically improved the effectiveness of technology-based marketing. CRM systems have brought businesses back to their ancestral roots by providing organizations with a collective memory of every customer and their interactions. Previously, this was cost-prohibitive.

However, providing the optimal message to a customer is still a very cumbersome and time-consuming process. As a result, corporations have not fully benefited from the promise of real-time customized and personalized marketing. Many customized content and personalization initiatives remain undeveloped because of their prohibitive human and financial costs of implementation.

With the traditional targeted marketing paradigm, the seller initiates an interaction with the customer by analyzing historical data to segment customers offline and then "pushes" a message out to the customer. The seller then hopes for a response. However, other more proactive methods are desired.

SUMMARY OF THE INVENTION

The present invention provides a system and method to select, from a predefined palette of content items, those items which are best suited for an individual. This selection is based both on the attributes of the viewer and the context in which the contents is viewed. (i.e., at that precise moment in time). The content may involve advertisements, articles, or multimedia, such as animated images, movies, or audio clips.

More specifically, the present invention provides a centralized system that defines and manages business rules to identify what content is most relevant to the individual viewer's context. Then upon receipt of the content selection request, a centralized system evaluates the viewer's characteristics, the situational characteristics (context), and the viewer's personal history against the coded rules in order to select an optimal content set for display. Then the selected content is returned to a local system that serves the selected content to the viewer. Essentially, a number of diverse content items can be managed by the system, wherein each content item may have one or more coded rules which define the viewer and content in which content would be presented to the viewer.

In effect, each item of content has a rule which describes a "profile" of what an ideal viewer or presentation opportunity. When the content selection request is made, the coded rules associated with each relevant item are evaluated to determine if an appropriate viewing opportunity exists. If the rule is satisfied, the system then adds the content item, within a prioritized queue, to an aggregated body of content items for this presentation opportunity. The items are then sorted, by descending priority, with the most significant items being returned for presentation. The prioritized list is returned based on the results of evaluating the individual content items against various business rules. This produces a prioritized list of items most suitable for presentation to the viewer in the viewer's current viewing context.

Several advantages are provided. First, the ability to perform the evaluation process in real time, at the moment of the request is a significant advantage over existing systems. This allows the content selected to be sensitive to the current presentation opportunity rather than the data warehouse intensive traditional model which selects content days, and even weeks, beforehand. The present invention may also couple to enterprise data sources, customer care systems, and external data sources such as credit scoring bureaus, etc. to provide a very rich palette of information on which to base the content selection rules.

A detailed log of each request made, along with any/all content items selected for presentation, provides for auditability and effectiveness metrics, as well as inputs for a "feedback loop" in which future presentation opportunities can be made based on prior decisions. For example, a rule could be constructed such that an individual item of content would be highly prioritized under default conditions, but would be deprioritized in favor of other content items after the original item had been presented to a viewer. One implementation may reduce an item's priority after the item has been viewed three times in a 24-hour period.

An advantage of the present invention is that the rules defining the optimal presentation opportunity do not need to be maintained in executable code by the administrator or user. The rules are captured in a representative notational format via a rule-builder GUI application, and then stored in an XML encoded structure within repository. As they are not a part of the presentation engine (such as a web server), they can be changed at will without the need to update or test the web server or HTML source for the web pages the content is to be presented in. The items of content are managed in a hierarchical model, with each item inheriting characteristics from its parent to determine who may manipulate or change the rules which determine the rule's behavior unless a specific rule is established for the individual item. Ultimately, this allows the rules to be administered in a distributed fashion throughout an enterprise, or even to clients (usually advertisers) and business partners if the situation warrants such.

The invention can be invoked via a number of methods, including a J2EE compliant API library, a procedural interface suitable for linking into legacy applications written in C, COBOL, FORTRAN, etc., a Web Services interface, a C+ interface, or even a custom-developed API for an individual customer's needs.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the Figures, like numerals being used to refer to like and corresponding parts of the various drawings.

Figure 1:
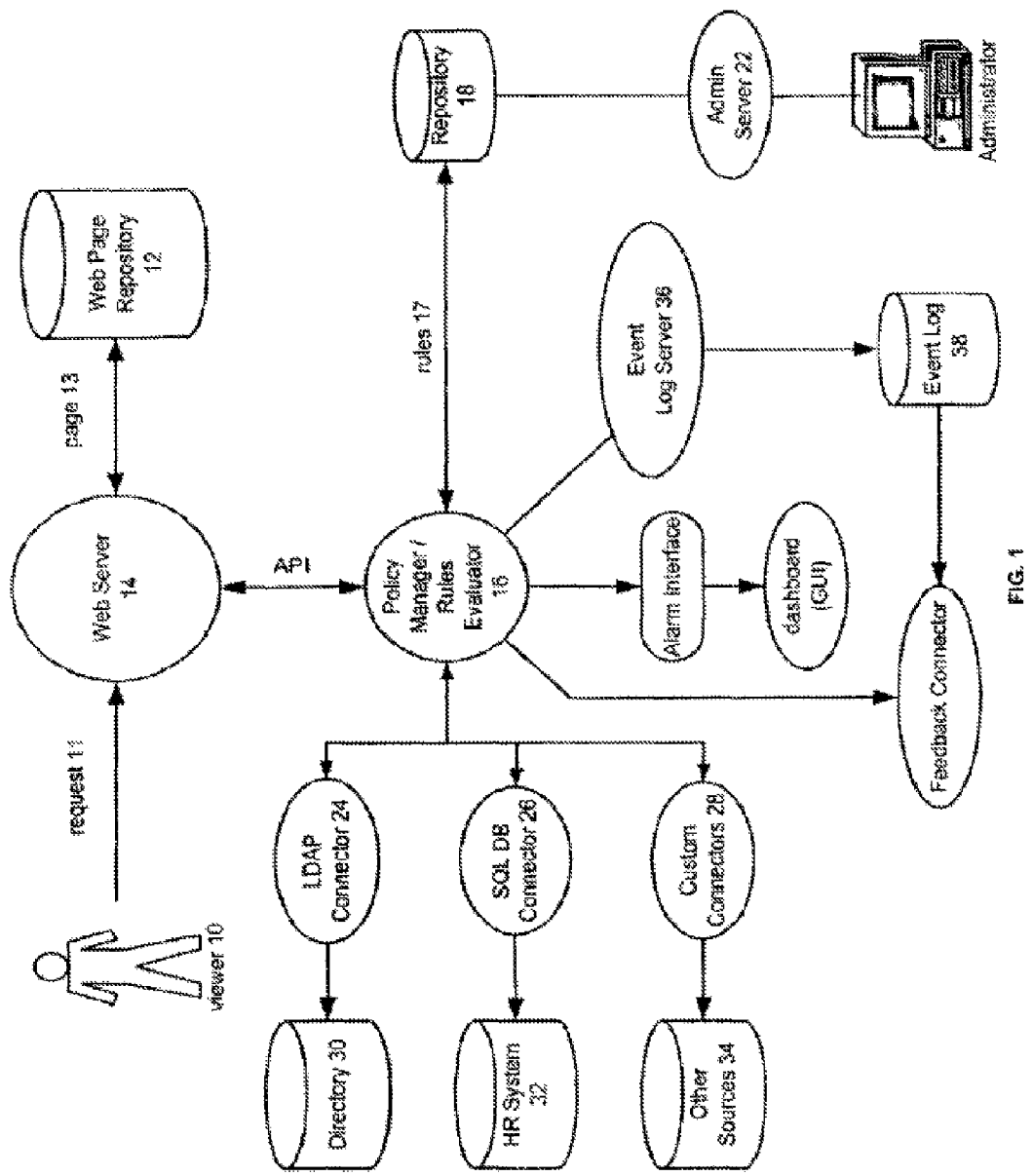
FIG. 1 depicts one basic implementation model to provide optimal content item for a particular viewer of a website.

One potential architecture for the use with the invention is depicted in FIG. 1. Here, user or viewer 10 requests a page of content from web server 14. Viewer 10 may have previously established his identity by authenticating in some fashion with web server 14. Alternatively, viewer 10 may be treated as having a default or anonymous identity.

Web server 14 loads page 13 from web page repository 12. Then web server 14 executes java servlets or other like instructions that are contained within page 13. The servlets invoke services application programming interface (API) which places a remote procedure call (RPC) into policy manager 16. This RPC requests content specifically chosen for viewer 10. Request 11 contains both the identity of viewer 10 and information that defines the set of rules and content items to be selected from a campaign or set of related content items.

Policy manager 16 uses a name associated with the campaign or set of related content item to retrieve a set of rules 17 from rules repository 18. Policy manager 16 then examines rules 17 to determine what additional information or data elements are required to evaluate rules 17.

Policy manager 16 invokes any/all connectors required, including but not limited to LDAP connector 24, SQL DB connector 26 and custom connector 28 to retrieve the information or data elements required to evaluate rules 17. These data elements may be within directory database 30, HR system database 32 and other data sources 34. These data sources return the data elements needed to policy manager 16.

Policy manager 16 enriches the decision context with the information retrieved. Policy manager 16 then evaluates the rules and creates an aggregated list of the content items associated with any/all rules whose criteria are met. Policy manager 16 then sorts the aggregated list in order of descending priority. The top "n" items of content ("n" being a number of items parameter passed on the ESAPI request), are selected and returned to web server 14 as the resultant of the ESAPI request. The web server then inserts those return content items into page 13, which may take the form of an HTML document. The customized page is then presented to viewer 10 via a web browser or other like application.

Event log 36 may track every transaction created and stored within repository 38. The information within event log 36 can provide the basis of metrics determining system usage and effectiveness as well as providing the inputs and capability on which to modify rules 17. For example, upon such information may include how many times a particular item has been presented to a specific viewer in a defined time interval.

Figure 2:
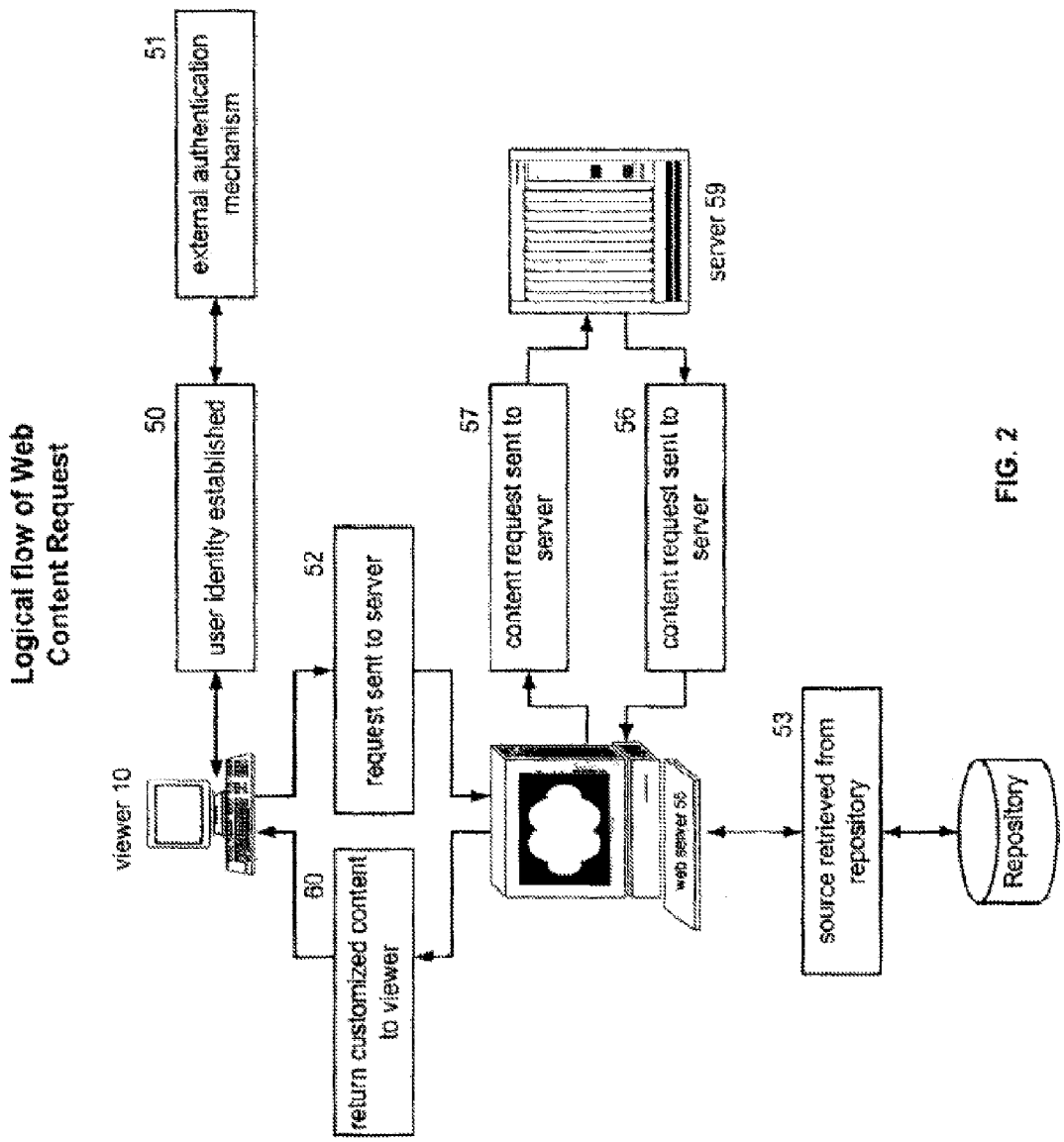
FIG. 2 provides a logical flow diagram relating to processing a content selection request.

FIG. 2 provides a process flow diagram that depicts the logical flow of web content request. The processing of a request to select content items for a viewer. In step 50, viewer 10 establishes their identity by authentication through a means such as external authentication mechanism 51. Next, a request is sent to web server 55 for a document in step 52.

In step 53, the document source is retrieved from the source repository, whereupon the web server executes instructions embedded within the document. Those instructions then invoke a services API in step 57 to request content from server 59. Optimal content is returned to web server 59 in step 56. Instructions within the document are then replaced with content. Then in step 60, web server 55 delivers the customized page to the user's browser for display.

Figure 3:
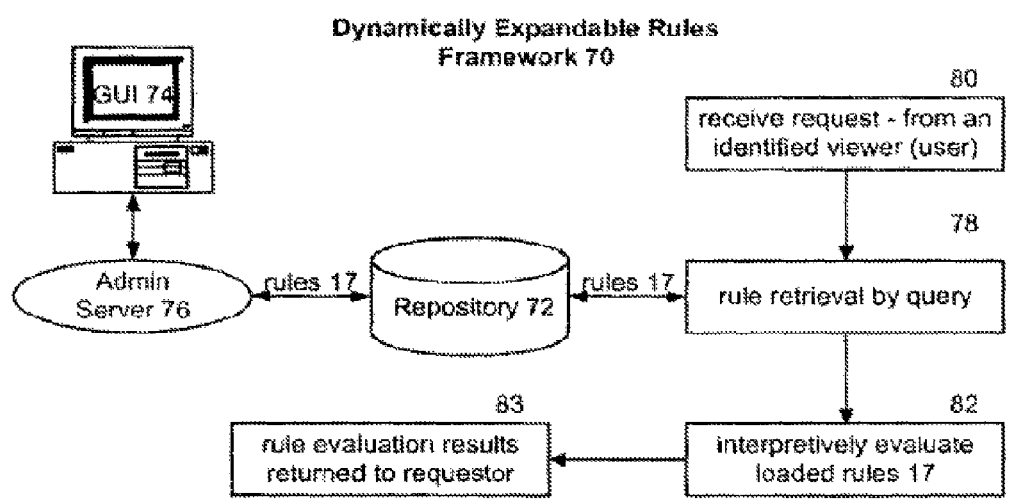
FIG. 3 is a diagram of the Dynamically Expandable Rules Framework that describes a process, implemented in code, by which invocation of a service can be made both enabled for parallel scaling and tolerant of failure of components in accordance with the present invention.

FIG. 3 depicts dynamically extensible rules management and evaluation framework 70. Rules evaluation engine is based upon the concept of using a process by which a policy is expressed as a rule, encoded in a machine-independent rules modeling language. The rule can be dynamically loaded from the repository 72 and evaluated upon demand within multiple execution contexts simultaneously. This provides for parallel scaling and fault tolerant capabilities. As the rules are loaded dynamically at evaluation time, rules may be created and/or changed at will, and will take effect upon the next evaluation request.

In FIG. 3, GUI 74 allows administrative users to access rules 17 stored within repository 72. GUI 74 also facilitates the ability of administrative users to create and modify coded rules based on business rules. GUI 74 interacts with repository 72 through server 76. The coded rules corresponding to the business rules are stored within repository 72. These rules 17 determine what content will be eligible to be presented to a viewer as previously described in FIGS. 1 and 2.

Rules 17 are retrieved from repository 72 following receipt of a content selection request that corresponds to query 78 that is received via web server 14 via input from user 10 through web server 14. Rules 17 are dynamically loaded and interpretively evaluated within process 82 wherein the results of this evaluation are returned to web server 14 or other requesting application in order to present the optimum content to a viewer.

Figure 4:
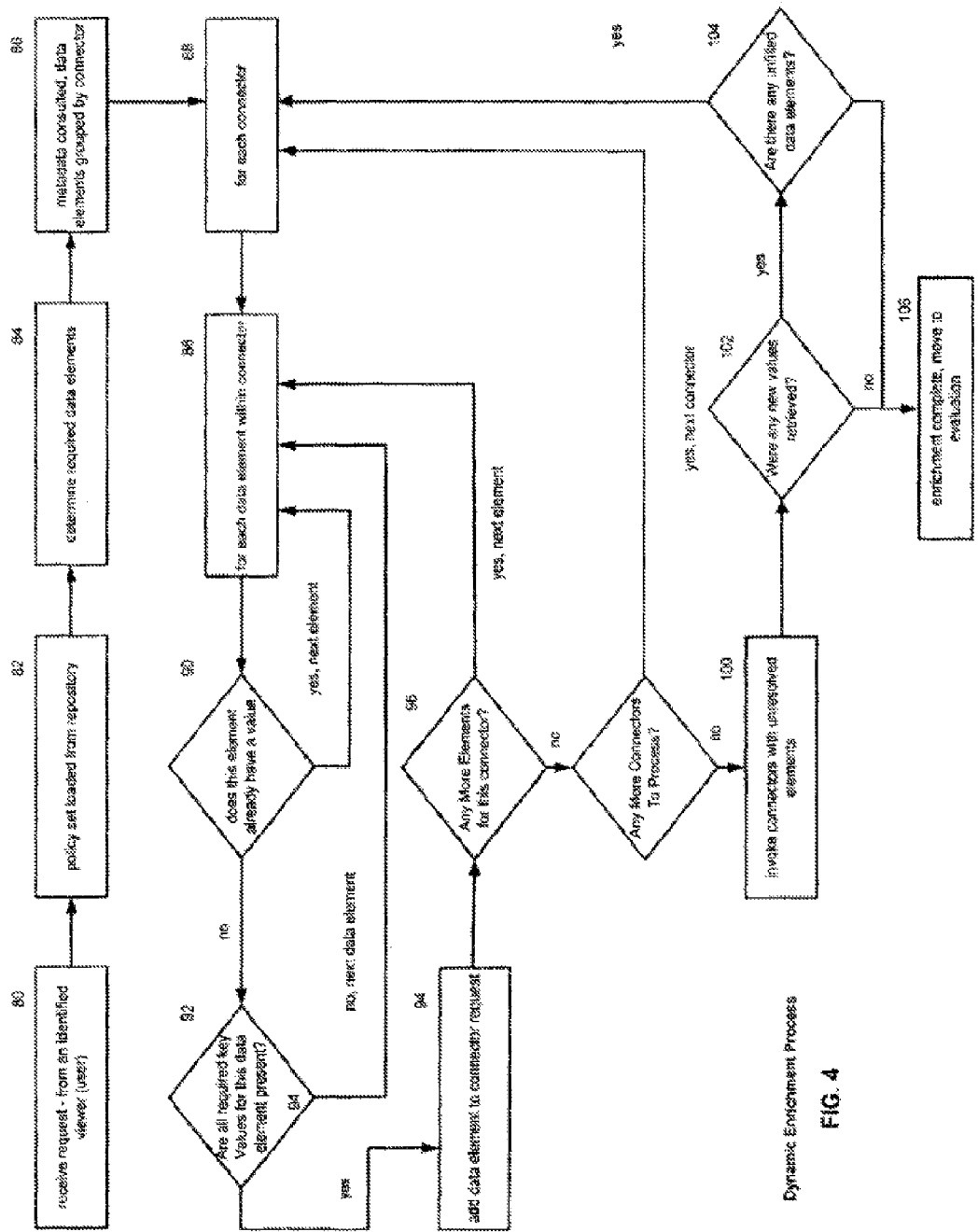
FIG. 4 is a logic flow diagram providing a Dynamic Enrichment Process that depicts utilizing the rules engine to determine whether all of the data elements required to evaluate the rule are available.

The concept of dynamic enrichment of the data is available within the decision context depicted in FIG. 4. The dynamic enrichment process involves receiving a request in step 80. In step 82, in response to the request, a policy set is loaded from repository in step 82. The policy set is analyzed to determine the required data elements in step 84. In step 86, metadata is consulted and data elements are grouped by connector. For each connector a determination is made in step 88 for data for each data element within the connector. This involves determining whether or not each data element already has a value at decision point 90. If it does, an evaluation is made for the next data element. If not, a determination is made a decision point 92 as to whether or not all required key values for this data element are present. If all the required key values for this data element are present the data element is added to the connector request in step 94, otherwise, a determination is made for the next data element. In decision point 96, a determination is made as to whether or not additional data elements are required for this data connector. If additional elements are required the next data element is evaluated returning to step 96. Otherwise, at decision point 98, a determination is made as to whether or not any more connectors remain to be processed. Additional connectors are processed as described above. Otherwise, the connectors with unresolved elements are invoked at step 100 in order to retrieve identified additional data elements. At decision point 102, a determination is made as to whether or not any new values were retrieved. If there were, at decision point 104, a determination is made as to whether any unfilled data elements remain in which case the process is repeated by returning to step 88 until no unfilled data elements remain as indicated at point 106. Essentially, feature allows the rules engine to determine when all the data elements required to evaluate the policy are present. If the answer is no, then the rules engine may, through connectors, map to and retrieve all requisite data elements before evaluating the rule.

Figure 5A:
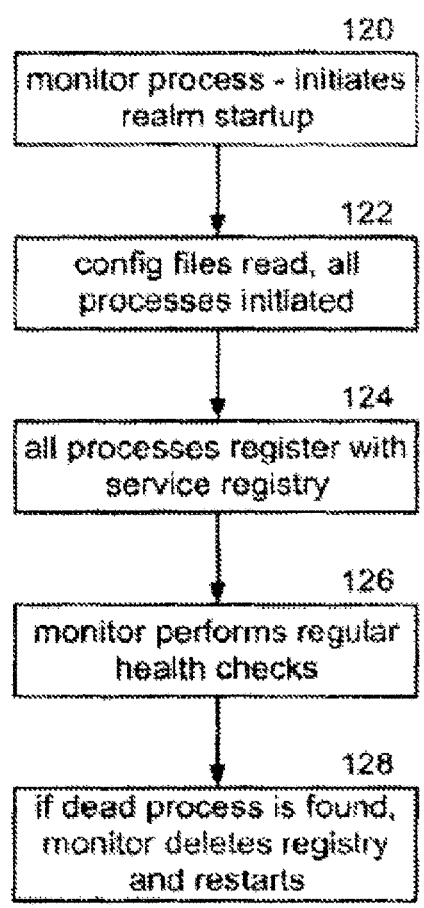
FIGS. 5A and 5B depict a Parallel Fault Tolerant Architecture that enables the invention to dynamically scale effectively across multiple servers and/or platforms while continuously servicing requests from the users/viewers.

A diverse, fault tolerant architecture that enables effectively scaling across multiple servers and/or platforms while continuously servicing content selection requests is depicted in FIGS. 5A and 58. This architecture effectively operates even when a multiple server loss occurs.

FIG. 5A depicts the process of realm startup. At step 120, the realm startup process is initiated. In step 122, all of the configuration files are read and associated processes are initiated. These processes are all registered with the service registry in step 124 after which the monitor performs regular health checks at predetermined intervals in step 126. If a dead process is found, the monitor deletes the registry and restarts the process in step 128.

Figure 5B:
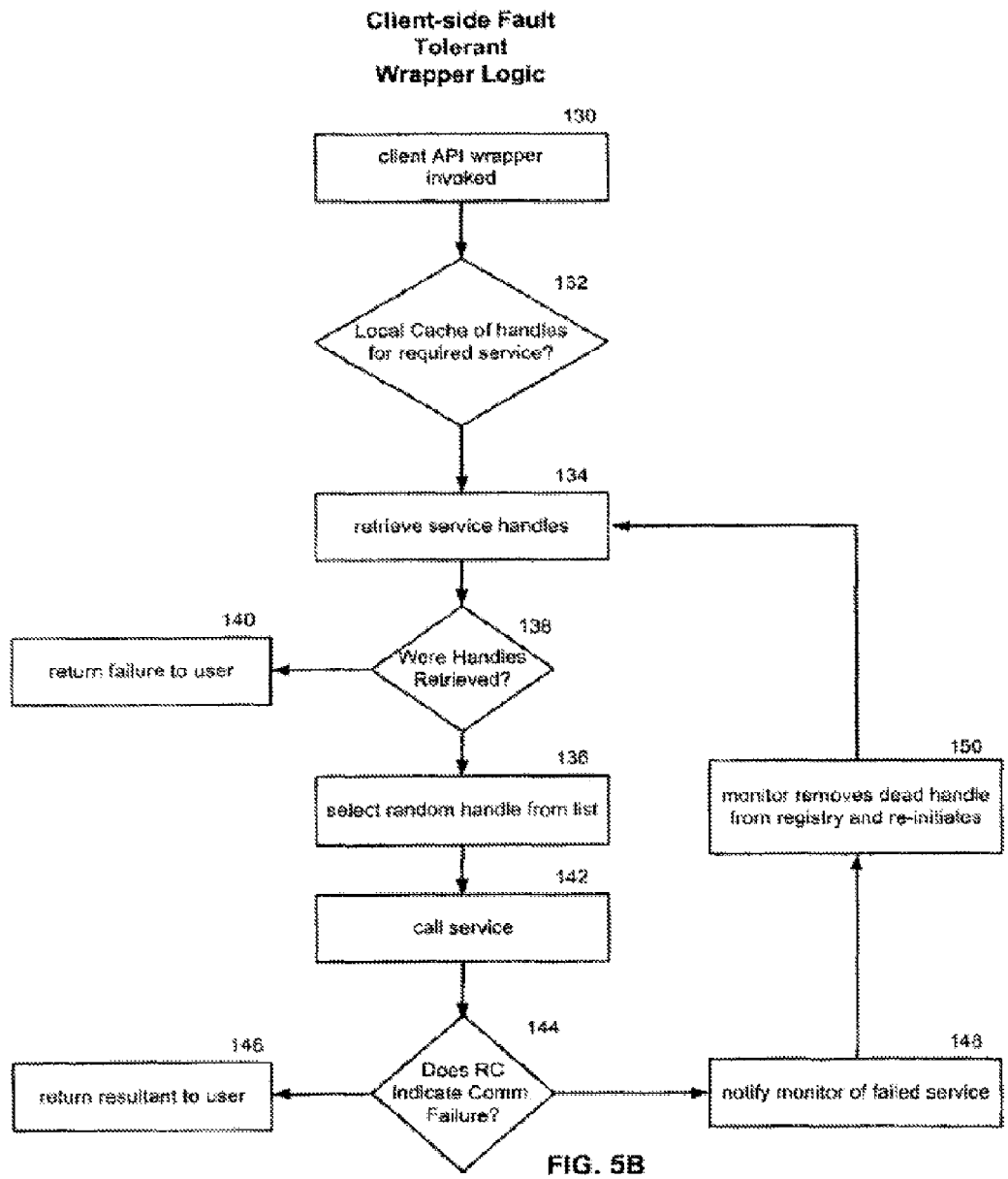
Figure 6:
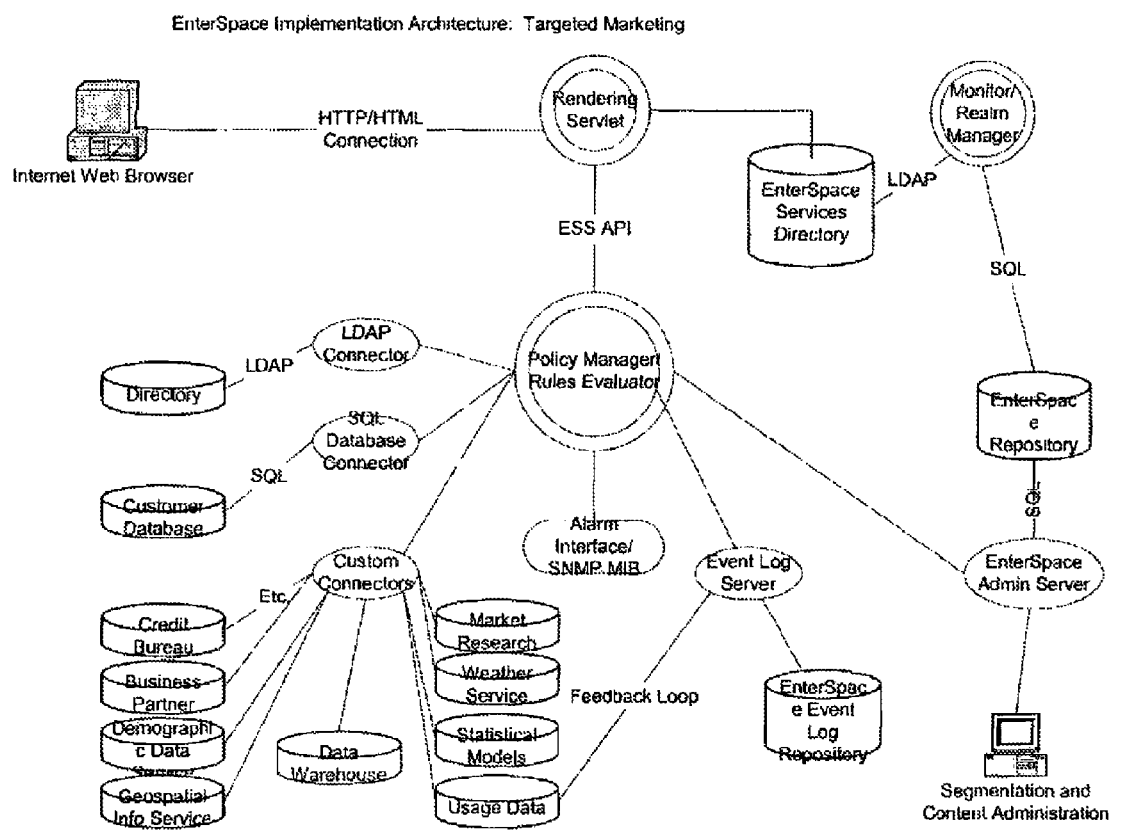
FIG. 6 shows an implementation Architecture for targeted marketing.

FIG. 5B depicts client side fault tolerant wrapper logic. Here, in step 130 a client API wrapper is invoked. At decision point 132, a determination as to whether or not local cache of handles is required for service. If not required for service, the service handles are retrieved in step 134. Otherwise, a random handle is selected from an available list in step 136. Returning to retrieving service handles, decision point 138 evaluates whether or not handles were retrieved. If they were not, a return failure is made to the user in step 140. Otherwise, we progress to step 136 where the random handles are selected from the list. In step 142, a service call is initiated, after which at decision point 144, a determination is made as to whether or not a communication failure is indicated. If no communication failure is indicated, the resultant is returned to the user in step 146. Otherwise, the monitor is notified of failed service. In step 148, the dead handles are removed from the registry and reinitiating begins in step 150, after which the process returns to step 134.

The current implementation of this concept is built upon a Java infrastructure, and utilizes a number of fairly obscure features of the Java language to facilitate the service. The two most prominent of these are the concept of a dynamic class loader, and HTTP/XML RPC architecture used to manage the interaction between processes.

It is important to note that while one embodiment is implemented in the Java language, the concepts that distinguish the present invention are notably not Java specific, and in no way should the claims be restricted to the Java language or the platforms on which it runs. In a procedural language such as C/C++, PL/1, etc. the same concepts could readily be implemented through the use of dynamically shared libraries or through dynamic overlay methods that are well defined and commonplace.

While the embodiments discussed above focus on serving content to a web server, the present invention may also service other delivery mechanisms such as a Voice Response Unit (VRU), a wireless device such as a pager or cell phone, etc.

Although the present invention is described in detail, it should be understood that various changes, substitutions and alterations can be made hereto without departing from the spirit and scope of the invention as described by the appended claims.

The present invention provides a marketing system and method that substantially eliminates or reduces disadvantages and problems associated with previously developed systems and methods used for segmenting and targeting marketing.

More specifically, the present solutions offer an alternative approach to addressing the problem of targeted marketing. One embodiment performs the segmentation of the customer, and the selection of content targeted at that customer, in real time at the moment of the presentation event. This allows the segmentation decision to take into account a great many factors that were traditionally unavailable for inclusion in the segmentation process. In effect, real-time evaluation of the segmentation policy allows the selection of the most advantageous message content FOR THAT SPECIFIC USER AT THE PRECISE MOMENT OF THE PRESENTATION EVENT.

A specialized high-speed rules evaluation framework couples with an adaptive connector infrastructure for retrieving the customer's characteristics when the evaluation request is made. The sequence is as follows:

1. The system is instructed as to how to retrieve on demand the customer characteristics required to evaluate the segmentation rules. The characteristics may not be specifically associated with the customer. For example, they may be items such as national security alert status; the current Dow-Jones index, weather within the customer's zip code, etc.

2. The segmentation policies are written as rules, and stored within a rules repository. Each rule defines a customer segment. For example, one such segment might be "Unmarried males, between the ages of 26 and 31, who own their home, drive an SUV, and have incomes greater than S87K/year.

3. A specifically focused advertising message is crafted, and associated with the segmentation rule as a "Payload", along with a delivery priority. The priority represents the order of importance for each message to be delivered, and determines which message should be presented first in the event that the customer is eligible for more than one message.

4. A "Campaign" is created, which associates together all the segmentation rules, which compete for the presentation opportunity. This Campaign is then associated with a delivery mechanism such as a particular area within a web page.

5. All the prior steps were preparatory—now we focus in on the actual presentation event. In the website example, the customer's identity is established by an interaction with either his web browser or the web server—there are many, many ways in which this can be accomplished. The service is not involved in the establishment of the identity, but requires an identity to work with as a prerequisite to operation.

6. The customer instructs his browser to connect to the web server, and serve up a specific html dataset of content.

7. The Web server loads the dataset from disk, and examines it to determine if there are any required actions to be taken prior to sending it to the customer's browser. In this case, it finds a scripted invocation request associated with a specific frame or table on the page.

8. The web server s initiates execution of the scripted action, which invokes the rules processing infrastructure and passes along as parameters the identity of the customer, the campaign associated with that area of the page, any transaction specific values that might be needed in the rules evaluation, and the number of responses (usually 1).

9. The rules engine loads the campaign and all the segments referenced by it from the rules repository into memory.

10. A list is compiled of all the variants required to evaluate the campaign's segmentation policies, and then is compared against the values passed in on the request.

11. If additional variable values need to be obtained prior to evaluating the rule, the rules engine dispatches requests to the connector infrastructure to retrieve all the needed items.

12. The connectors retrieve the missing data, and return it to the rules engine.

13. The rules engine now enters evaluation—each segment of the campaign is analyzed separately to determine if the customer meets all the criteria to cause it to "fire".

14. When a segment "fires", the payload and priority associated with it are inserted into what is known as the "aggregated response set", essentially a list of all those payloads and priorities associated with segments the customer matches.

15. The list is then sorted by descending priority. This means that those messages with the highest priority will be at the top of the list.

16. The engine then returns to the web server a response set containing up to the requested number of messages, in descending priority. While in most cases this would be only one, the architecture allows for as many messages as the web server requests—this enables the system to be used for multiply-occurring, non-exclusive. events such as examining the "shopping cart" and presenting messages associated with each item in it.

17. An event log is updated indicating that the request has been processed, and listing the campaigns, segments, and variable values that were used to evaluate it as well as the aggregated, prioritized list of content returned to the web server.

The script in the web page is replaced with the customized content prior to delivering the page to the user's browser. In effect, the web page has been "tailored" with content deemed to be optimal for that customer's segment.

A final specification, and perhaps the most revolutionary utilization of the design, is the enablement of an "auction" scenario, whereby multiple advertisers can effectively "bid" against each other in a competition for the presentation event for an individual situation and customer.

In this scenario, a campaign would be created and associated with, for example, a section of the web page used by a content publisher such as Yahoo, AOL, etc. Each advertiser would then be allowed to utilize the system to create their own segmentation policies and associate payloads and priorities with them. When the customer requested that the web page be served up, the campaign would be invoked, and the segments would be evaluated. The aggregated response set would be created, then sorted, and the advertiser with the highest "bid" (stored as a priority) would be awarded the presentation event. The priority "bid" would effectively represent the amount the advertiser was willing to pay in order to have that particular message presented to that particular individual at the time of the presentation event.

Post-processing of the event logs (which record all of the context information, policies, and resultants returned) would then provide a basis for billing the advertisers for the presentation event—at their bid price. This represents a capability that does not, at this time, exist anywhere else. Note that the segmentation policies for the competing segments do not have to be based upon the same segment definitions, or even on the same customer characteristics—each segment is evaluated independently, and the only points of correspondence between segments are their association with a common campaign and the "bid" or priority which determines which of the eligible payloads are presented.

The priority itself can either be statically defined within the segmentation policy, or can be a retrieved or computed value returned by the connector infrastructure. In this way, for example, a connector could be constructed to return a "correlation coefficient" which indicated the customer's similarity to a statistical model of the ideal customer. For a customer who matched the model closely, the coefficient would be high, and the bid would be correspondingly high. For a marginal customer, however, the bid would be computed at a lower level.

Use of this model offers a unique opportunity to both the advertiser and the media publisher. The advertiser is given the opportunity to target only those customers who they have identified (through the segmentation policies) as being good candidates for the particular marketing messages they've chosen to present. Elimination of unproductive segments (and the costs. of presenting messages to those segments) allows the advertiser to maximize his return on investment by paying a premium price for a premium opportunity that is highly likely to result in a sale rather than taking a "shotgun" approach. Even if he spends more on a per-presentation basis, his effective yield on a sales-per-advertising-dollar basis should improve.

The media publisher, meanwhile, gains a valuable revenue-optimization capability in that each opportunity to present a marketing message to an individual customer will yield the maximum revenue for that event—he's effectively auctioning off each presentation opportunity to the highest bidder one customer at a time.

Although the present invention is described in detail, it should be understood that various changes, substitutions and alterations can be made hereto without departing from the spirit and scope of the invention as described.

What is claimed is:

1. A computer-implemented system comprising:
   one or more rule repositories comprising at least one rule;
   one or more content items, wherein at least one of the content items is associated with at least one of the rules;
   one or more servers operable to:
   receive a content item request for content items to be presented to a viewer from a requesting system;
   receive input, wherein the input comprises information about the number of times a content item has been previously presented;
   evaluate one or more of the rules to determine a set of content items, wherein at least one of the content items in the set is associated with a priority, wherein the priority is based, at least in part, on the input; and prioritize at least a portion of the content items in the set.

2. The method of claim 1, wherein the priority is a bid.

3. The system of claim 2, wherein the input further comprises zip code information.

4. The system of claim 2, wherein the input further comprises information related to a financial index.

5. The system of claim 2, wherein the input further comprises information retrieved from a geospatial information service.

6. The system of claim 2, wherein at least a portion of the input comprises information retrieved from a credit bureau.

7. The system of claim 2, wherein at least a portion of the input comprises information retrieved from a market research data supplier.

8. The system of claim 2, wherein at least one a portion of the input is retrieved from a business partner.

9. The system of claim 2, wherein at least a portion of the input is information retrieved from a demographic data source.

10. The system of claim 2, wherein at least a portion of the input is retrieved from a weather information source.

11. A computer-implemented method comprising:
   receiving by a server a content item request for content items to be presented to a viewer from a requesting system;
   accessing one or more rule repositories comprising at least one rule, wherein at least one of the rules is associated with at least one of one or more content items;
   receiving input from one or more data repositories wherein the input comprises information about the number of times a content item has been previously presented;
   evaluating one or more of the rules to determine a set of content items, wherein at least one of the content items in the set is associated with a priority, wherein the priority is based on, at least in part, on the input; and
   prioritizing at least a portion of the content items in the set.

12. The method of claim 11, wherein the priority is a bid.

13. The method of claim 12, wherein the input further comprises zip code information.

14. The method of claim 12, wherein the input further comprises information related to a financial index.

15. The method of claim 12, wherein the input further comprises information retrieved from a geospatial information service.

16. The method of claim 12, wherein at least a portion of the input comprises information retrieved from a credit bureau.

17. The method of claim 12, wherein at least a portion of the input comprises information retrieved from a market research data supplier.

18. The method of claim 12, wherein at least one a portion of the input is retrieved from a business partner.

19. The method of claim 12, wherein at least a portion of the input is information retrieved from a demographic data source.

20. The method of claim 12, wherein at least a portion of the input is retrieved from a weather information source.

* * * * *